United States Patent [19]

Kinney et al.

[11] Patent Number: 5,193,158

[45] Date of Patent: Mar. 9, 1993

[54] METHOD AND APPARATUS FOR EXCEPTION HANDLING IN PIPELINE PROCESSORS HAVING MISMATCHED INSTRUCTION PIPELINE DEPTHS

[75] Inventors: Daryl F. Kinney, Hopkinton; Anthony N. Drogaris, Wellesley; Christopher H. Mills, Chelmsford; Michael Kahaiyan, East Bridgewater; John Manton, Marlboro, all of Mass.

[73] Assignee: Hewlett-Packard Company, Palo Alto, Calif.

[21] Appl. No.: 780,527

[22] Filed: Oct. 18, 1991

Related U.S. Application Data

[63] Continuation of Ser. No. 259,793, Oct. 19, 1988, abandoned.

[51] Int. Cl.$^5$ ............................. G06F 9/38; G06F 15/16
[52] U.S. Cl. ..................................... 395/375; 395/800; 364/DIG. 1; 364/228; 364/228.6; 364/230.2; 364/231.8; 364/263; 364/265.4; 364/265.6; 364/266.5; 364/285.2
[58] Field of Search ... 364/200 MS File, 900 MS File, 364/DIG. 1, DIG. 2; 395/375, 800

[56] References Cited

U.S. PATENT DOCUMENTS

| | | | |
|---|---|---|---|
| 3,654,448 | 4/1972 | Hitt | 364/200 |
| 3,736,566 | 5/1973 | Anderson et al. | 364/200 |
| 4,161,026 | 7/1979 | Wilhite | 364/200 |
| 4,385,365 | 5/1983 | Hashimoto et al. | 364/900 |
| 4,399,507 | 8/1983 | Cosgrove et al. | 395/375 |
| 4,488,228 | 12/1984 | Crudele et al. | 364/200 |
| 4,498,136 | 2/1985 | Sproul, III | 364/200 |
| 4,521,851 | 6/1985 | Trubisky et al. | 364/200 |
| 4,530,052 | 7/1985 | King et al. | 364/200 |

(List continued on next page.)

FOREIGN PATENT DOCUMENTS

A30111776 6/1984 European Pat. Off..
A10208181 1/1987 European Pat. Off..

OTHER PUBLICATIONS

Smith, James E., and Pleszkun, Andrew R., "Implementation of Precise Interrupts in Pipelined Processors," *Conference Proceedings*, The 12th Annual International Symposium on Computer Architecture, Boston, Ma., Jun. 17-19, 1985, pp. 36-44.

*Primary Examiner*—David L. Clark
*Assistant Examiner*—Matthew C. Fagan

[57] ABSTRACT

Method and apparatus for sequentially executing a plurality of pipelined instruction words of a program in which each instruction has independently selectable execution cycle count latencies. After the occurrence of an exception, instructions are identified which began after the instruction that caused the exception, and which have completed execution before execution of the exception provoking instruction was inhibited. Detection of an exception causes the processor to inhibit further execution of the exception provoking instruction. Pending instructions, which have yet to complete their execution prior to the inhibition of the exception provoking instruction, are similarly inhibited from further execution. Subsequently, the exception is serviced and the exception inducing instruction is restarted for re-execution in the processor. Pending instructions are subsequently re-executed in the sequence of their occurrence at the time the exception provoking instruction caused the processor to inhibit further instruction execution. Completed instructions are not re-executed. Applicable to computing systems having a plurality of processors, of either the same or different type such as floating point and integer processors, the method and apparatus inhibits all such further execution of plural processors upon the detection of an exception in one of the processors. In processors other than the processors serving the exception, no-op instructions are executed until the processor servicing the exception causes pending instructions to be re-executed, at which time the other processors also re-execute instructions which were pending at the time further execution of the instructions was inhibited.

11 Claims, 3 Drawing Sheets

U.S. PATENT DOCUMENTS

| | | | |
|---|---|---|---|
| 4,541,047 | 9/1985 | Wada et al. | 364/200 |
| 4,566,103 | 1/1986 | Sato et al. | 364/200 |
| 4,594,660 | 6/1986 | Guenthner et al. | 364/200 |
| 4,597,044 | 6/1986 | Circello | 364/200 |
| 4,639,886 | 1/1987 | Hashimoto et al. | 364/200 |
| 4,701,915 | 10/1987 | Kitamura et al. | 364/200 |
| 4,745,547 | 5/1988 | Buchholz et al. | 364/200 |
| 4,750,112 | 6/1988 | Jones et al. | 364/200 |
| 4,763,294 | 8/1988 | Fong | 364/200 |
| 4,777,593 | 10/1988 | Yoshida | 364/200 |
| 4,782,441 | 11/1988 | Inagami et al. | 364/200 |
| 4,783,783 | 11/1988 | Nagai et al. | 364/200 |
| 4,797,816 | 1/1989 | Uchiyama et al. | 364/200 |
| 4,845,659 | 7/1989 | Hrusecky | 364/900 |
| 4,875,160 | 10/1989 | Brown, III | 364/200 |
| 4,879,676 | 11/1989 | Hansen | 364/748 |
| 4,893,233 | 1/1990 | Denman et al. | 364/200 |
| 4,901,233 | 2/1990 | Liptay | 364/200 |
| 4,903,264 | 2/1990 | Talgam et al. | 364/200 |
| 4,914,578 | 4/1990 | MacGregor et al. | 364/200 |
| 4,924,466 | 5/1990 | Gregor et al. | 364/200 |
| 4,956,767 | 9/1990 | Stephenson | 364/200 |
| 4,970,641 | 11/1990 | Hester et al. | 364/200 |
| 5,003,458 | 3/1991 | Yamaguchi et al. | 364/200 |
| 5,003,462 | 3/1991 | Blaner et al. | 364/200 |
| 5,019,967 | 5/1991 | Wheeler et al. | 364/200 |
| 5,051,885 | 9/1991 | Yates, Jr. et al. | 364/200 |
| 5,063,497 | 11/1991 | Cutler et al. | 395/800 |
| 5,109,514 | 4/1992 | Garner et al. | 395/800 |
| 5,119,483 | 6/1992 | Madden et al. | 395/375 |
| 5,134,561 | 7/1992 | Liptay | 395/425 |

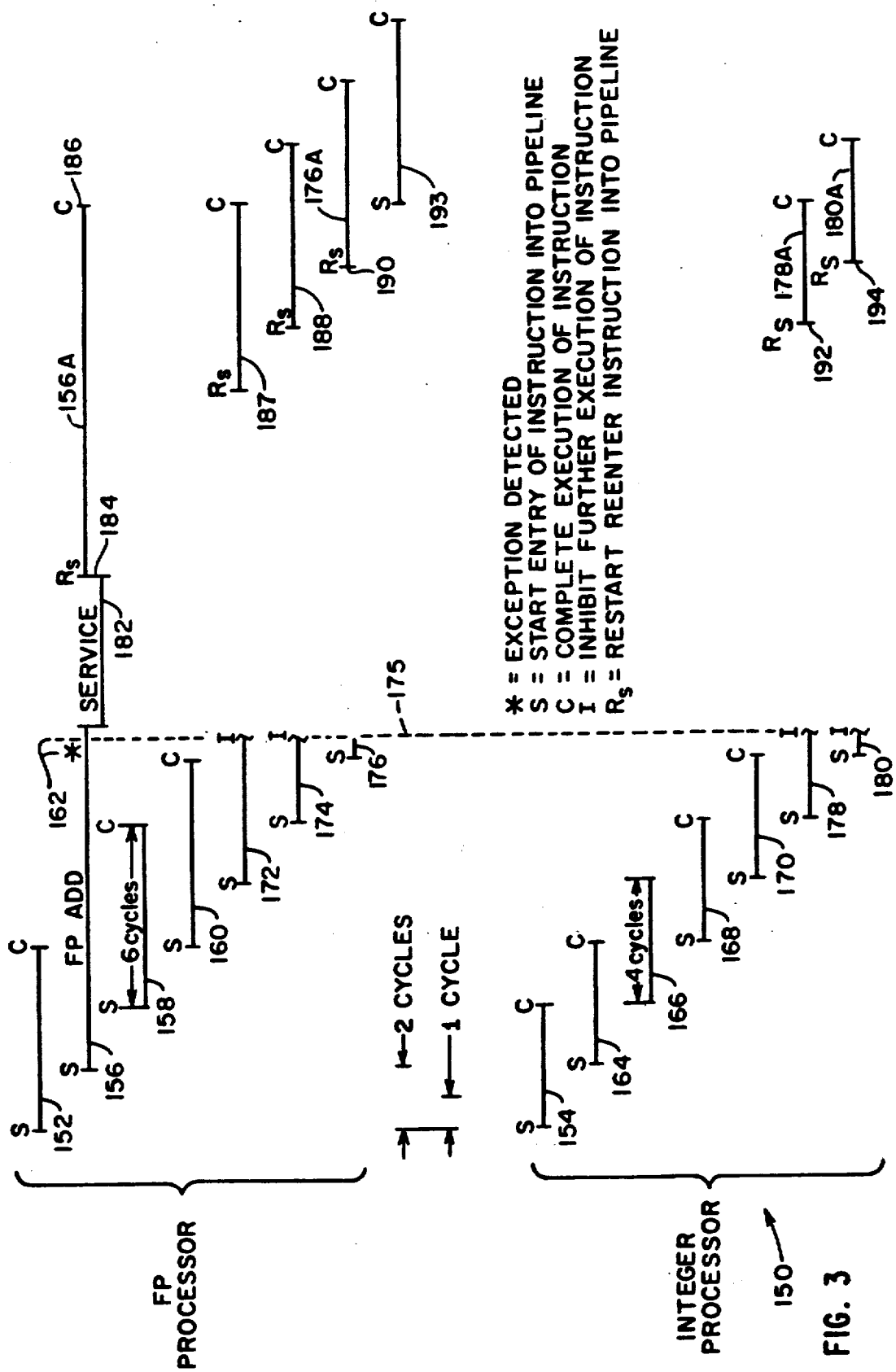

METHOD AND APPARATUS FOR EXCEPTION HANDLING IN PIPELINE PROCESSORS HAVING MISMATCHED INSTRUCTION PIPELINE DEPTHS

This application is a continuation of application Ser. No. 07/259,793, filed Oct. 19, 1988, now abandoned.

FIELD OF THE INVENTION

The present invention relates to computer pipeline processors, and in particular to pipeline processor methods and apparatus for handling exceptions and instructions of differing execution cycle count latencies.

BACKGROUND OF THE INVENTION

The execution of program instructions typically requires a sequential execution of various operations directly related to the instruction, such as instruction fetch, decode, execute and result read/store. Pipelined processors allocate specific hardware elements to each of these operations, and sequentially process succeeding instructions so that each of the hardware elements associated with the various instruction operations function constantly albeit for two or more separate instructions. For an instruction having four separate operation stages which may be sequentially performed in time, a pipeline processor would incorporate four separate hardware elements, each to specifically provide the operation corresponding to the four operation stages of the instruction. A first instruction would be received by the first element to provide a first operation during the first time cycle. A second element would perform the second operation of the first instruction while the first element would acquire the next instruction to provide the first operation of the second instruction. Two cycles subsequently, a fourth element is processing the fourth operation on the first instruction, the third element is providing the third operation on the second instruction, the second element is providing the second operation on the third instruction and the first element is providing the first operation on the fourth instruction. The pipeline processing continues as long as instructions are sequentially received by the processor pipeline or until an exception is generated by one of the four elements of the pipeline processor. The exceptions relate to an unacceptable condition resulting from the processing of a particular instruction, such as page fault, a register overflow, or other condition of invalid data or instructions. While exceptions may occur at any point in the execution of an instruction, the most severe exception recovery requirement occurs when the exception is indicated in the later cycles of the instruction execution.

The number of cycles necessary to execute an instruction is dependent on the particular instruction. The instruction set may comprise instructions which require the same number of execution cycles, or may include instructions requiring varying numbers of execution cycles resulting in a corresponding variability in the number of processor execution elements. When an exception occurs, the processor inhibits the subsequent execution of the instruction which provoked the exception, services the exception and restarts that instruction and any subsequent instructions. However, processors having variable length instruction execution times face a condition where an exception may be generated by a long execution cycle instruction (long instruction) which began before a subsequent, shorter execution cycle instruction (shorter instruction). When the exception occurs, the subsequent, shorter instruction may have completed its execution and modified the corresponding registers with the proper information. However, in the condition that the exception occurs after the completed execution of the shorter instruction, the known exception handling techniques would require that the instruction that provokes the exception, as well as the completed shorter instruction and any subsequent instruction be re-executed. The result would be multiple execution shorter instructions producing erroneous computation. Consequently, the implementation of pipeline processors to service variable execution length instructions has been held in disfavor, or the variability of the instruction execution cycles is strictly controlled to avoid the above-mentioned condition of completed execution of a subsequently begun, shorter instruction. Such design considerations impose unnecessary limitations in computer architecture, function and efficiency.

SUMMARY OF THE INVENTION

The method and apparatus of the present invention provides for the efficient execution of an instruction set including instructions of variable length execution cycle times. The compiling and execution of instructions is not limited by considerations of exception handling. In particular, the worst case condition of a late reported exception in a long instruction which occurs after the completion of one or more subsequently shorter instructions results in the selective re-execution of only the instruction which provoked the exception and any instructions which were unfinished or pending at the time the exception was detected and resulted in the inhibition of further execution of the exception producing instruction.

The preferred embodiment of the present invention further contemplates the control of a plurality of processors each simultaneously receiving different instructions from a common word received from a single instruction memory. An exception is generated in a first processor which provides the aforementioned exception handling wherein the completed instructions are not re-executed and the pending instructions are re-executed after servicing the exception. The second processor, in the case of multiple functional units within one CPU, does likewise. Also, according to the present invention, the multiple functional units can also comprise multiple processors synchronized at instruction dispatch. As a result, the apparatus and method according to the present invention provides increased processing flexibility while avoiding the errors resulting from out of order instruction completion following an exception.

BRIEF DESCRIPTION OF THE DRAWINGS

These and other features according to the present invention will be better understood by reading the following detailed description taken together with the drawing wherein:

FIG. 3 is a timing diagram showing the execution of variable length instructions by multiple processors according to the embodiment of FIG. 2.

DETAILED DESCRIPTION OF THE INVENTION

Figure 1:
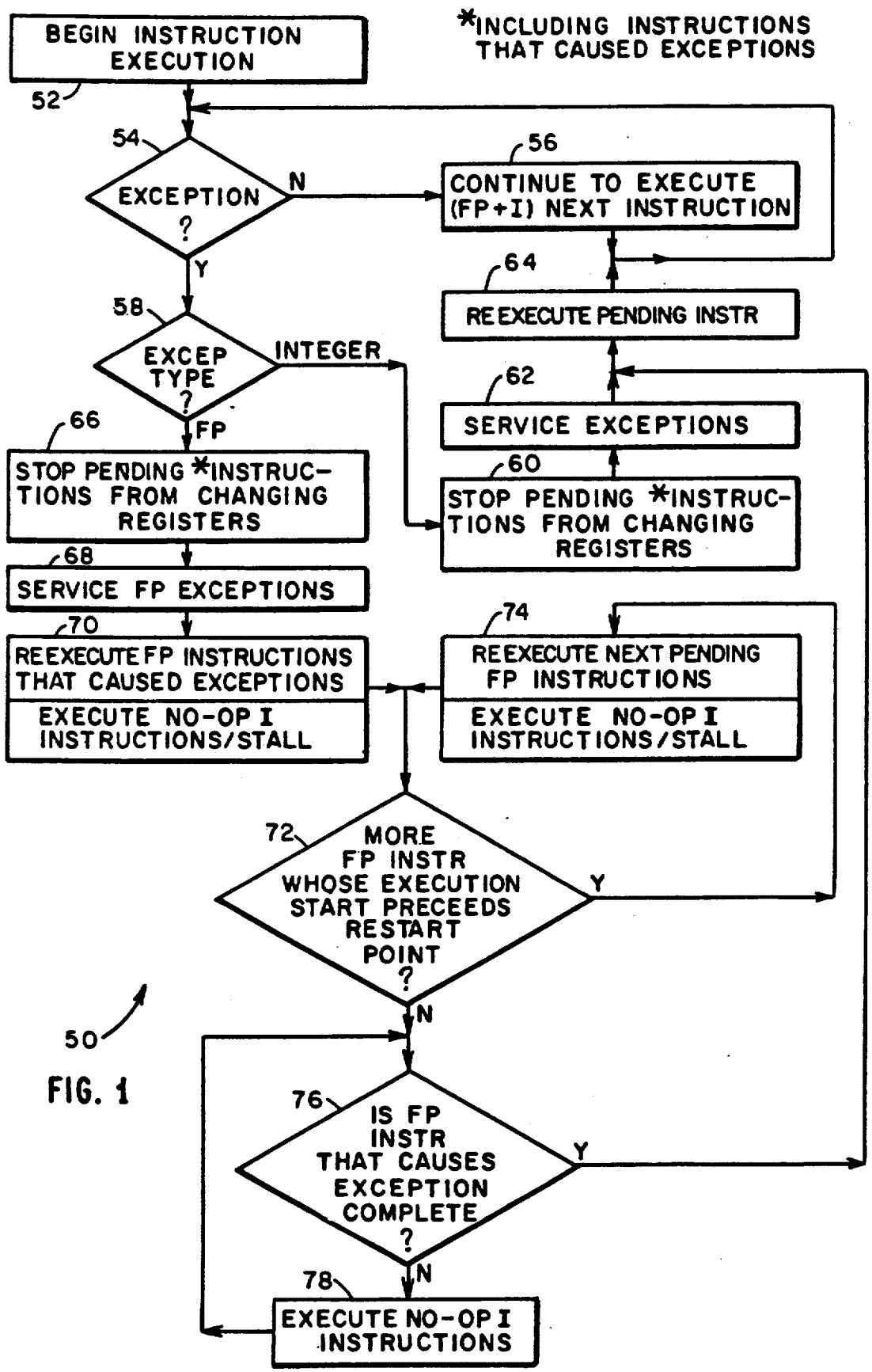
FIG. 1 is a flow chart illustrating the process according to the present invention.
Figure 2:
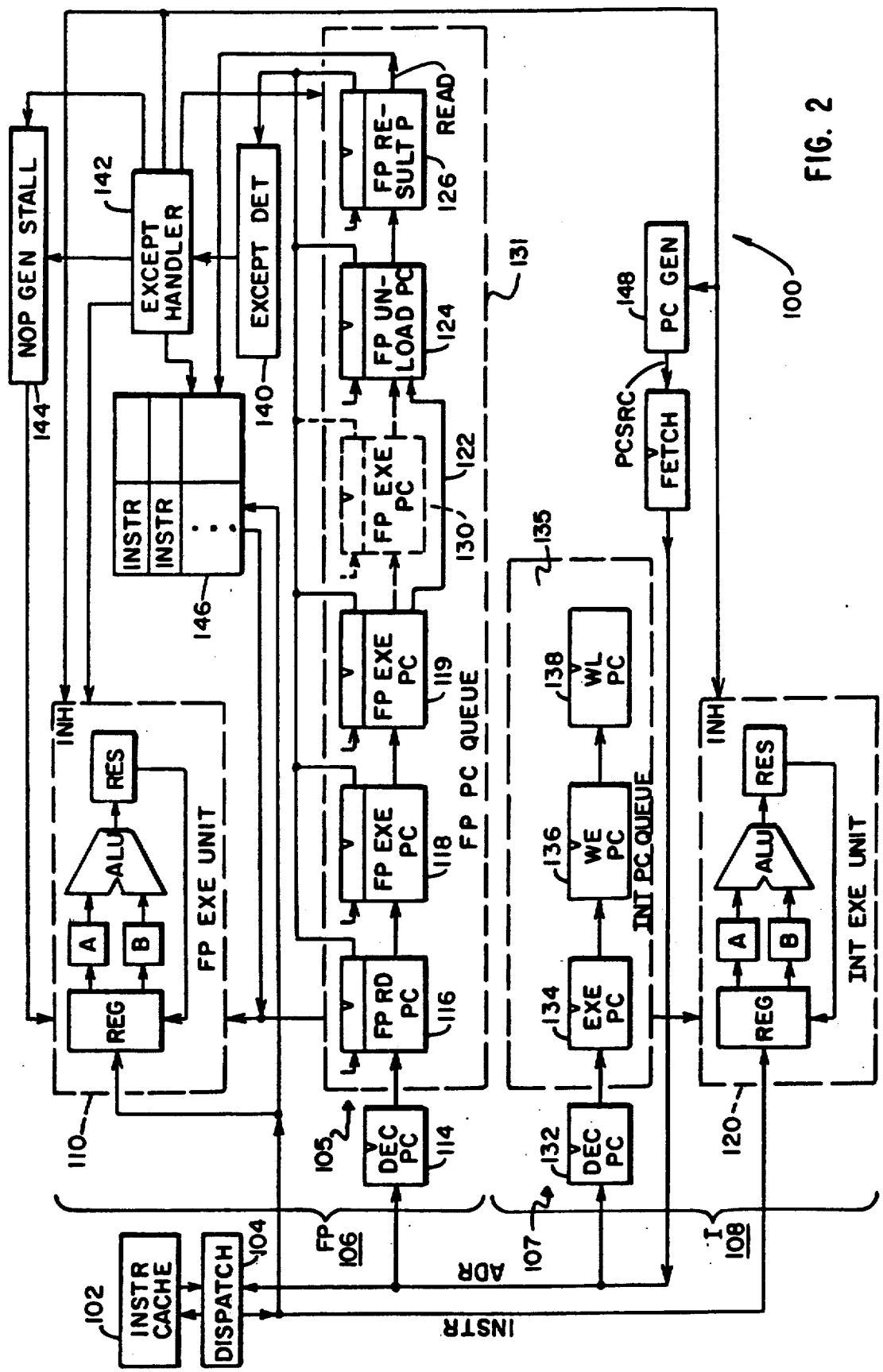
FIG. 2 is a block diagram of one embodiment of the present invention applied to a floating point and an integer processor having concurrent instruction dispatch.

8 The flow chart 50 of FIG. 1 illustrates one embodiment of the method of the present invention and relates to the embodiment 100 shown in FIG. 2 and to the timing diagram 150 of FIG. 3. The execution of instructions is begun at step 52 and the method of the present invention tests the appearance of an exception at 54, which results in the continued execution of the next instruction at step 56 if no exception has occurred. However, when an exception occurs a further test of exception type occurs as illustrated at step 58. In the embodiment of the present invention having only a single processor, the test at step 58 does not occur nor do the succeeding steps 60 and 62. However, in an embodiment of the present invention having a plurality of processors, the exception may differ in type according to the processor used. For instance, in the apparatus shown in the block diagram 100 in FIG. 2, there exists an integer and floating point processor, each having their own type of exception. In the present embodiment, the integer execution pipeline 107 is considerably shorter than that of the floating point execution pipeline 105. If the exception type has been determined to be an integer type at step 58 of FIG. 1, the execution of the pending instructions is inhibited, protecting the existing registers from change. The pending instructions are defined as instructions which have been received by at least one execution element in the pipeline processor but have not completed processing by the last element in the processor at the time that the exception causes the processor to stop execution. The exception is serviced by an exception handling subroutine or processor substructure, such as is known in the art, wherein the offending condition which invoked the exception is corrected. After the exception is serviced at step 62, the pending instructions of the integer processor are re-executed in step 64 and the process 50 resumes the testing of the executing program instructions, as previously discussed.

If it is determined that a floating point exception has occurred, step 58, all pending instructions are stopped at step 66 and the floating point exception is serviced at step 68 by floating point exception handlers, comprising software subroutines or hardware structures as illustrated in FIG. 2 or as otherwise known in the art. After the floating point exception is serviced and the offending condition corrected, the floating point instruction that caused the exception is re-executed at step 70 and the integer processor is held in a stalled condition or execute no-op codes. If it is determined at step 72 that there are no more floating point instructions whose execution start preceded the integer restart address point, it must be determined if the floating point instruction that caused the exception has been completed, as shown at step 76. If the floating point instruction that caused the exception has not completed execution, the integer processor is held in a stalled condition or otherwise executes no-op instructions (step 78). If the floating point instruction that caused the exception interrupt has been completed, re-execution of the pending integer instructions is restarted at step 64 and the process of testing for exceptions at step 54 and execution of subsequent instructions in the absence of an exception at step 56 continues.

If more floating point instructions exist whose execution start preceded the integer instruction sequence restart point, as determined at step 72 the next pending floating point instruction is re-executed at step 74 and the integer processor is held in a stall condition or executes no-op instructions, step 74. The determination of step 72 is continued until no instructions remain whose address precedes the restart point.

The structure 100 shown in FIG. 2 comprises one embodiment of the present invention wherein the instructions are provided from an instruction cache memory 102 through a dispatch unit 104, discussed in more detail in U.S. Pat. No. 5,051,885, entitled METHOD AND APPARATUS FOR CONCURRENT DISPATCH OF INSTRUCTIONS TO MULTIPLE FUNCTIONAL UNITS, filed Oct. 7, 1988, incorporated by reference. The floating point processor 106 and integer processor 108 receive a stream of instructions from the instruction cache according to a PCSRC Signal generated by the program counter generator (PC Gen) 148. In one embodiment of the present invention, the addresses provided to the instruction cache are also stored in sequence corresponding to the the execution cycles of the floating point and integer execution units 110 and 120, respectively. The sequential addresses are stored in floating point pipeline registers 114, 116, 118, 119, 124, and 126. As the present invention may comprise an instruction set having instructions of floating point variable execution length, the floating point pipeline may also include additional intermediate storage registers such as exemplary register 130 to correspond to the extended cycle count required for the execution of the particular floating point instruction. Any of the intermediate storage registers, such as register 130, which are required when the floating point pipeline 105 is processing "long instructions" are bypassed by signal path 122 when the floating point pipeline is processing "short" floating point instructions. Thus, a "short" floating point instruction which begins execution after a "long" floating point instruction may be completed and fully executed before the "long" floating point instruction is completely executed. The instruction addresses are also stored in integer processor pipeline registers 132, 134, 136 and 138 of the integer program counter queue 135, and correspond to the various stages of execution of the instruction by the integer execution unit 120.

In the embodiment of the present invention illustrated in FIG. 2, an exception may occur at one of many points in the execution of the floating point instruction. The floating point execution unit 110 provides various tests of instruction data or address as may be known in the art, and provides at least one resulting valid indicator bit which is stored in the floating point program counter queue 131 at a location reserved 21 in each of the floating point registers 116–126. When this bit becomes set, the resulting stored signal is received by an exception detector 140 which provides a signal to an exception handler 142 which causes the element 144 to generate no-op signals to be executed by the floating point execution unit, or causes the floating point execution unit 110 to assume a stall condition. The exception handler causes the execution unit to correct the condition which produced the exception. The contents of the floating point program counter queue 131 and the corresponding instruction is stored in an exception recovery buffer 146, having the pending instructions contained therein to be executed upon the completion of the servicing of the exception. The program counter generator 148 is inhibited from producing new instructions while the exception is being serviced, and is permitted to resume production of further instruction addresses when the last of the pending instructions has begun re-execution. The exception service dumps the processor state, services the exception, then restores the state. The integer processor 120, inhibited when the exception handler 142 services the exception, is also permitted to re-execute the pending instructions after the exception is serviced by the exception handler 142.

Alternate embodiments of the present invention envision the storage of the instructions in a sequence of registers in place of the storage of the instruction addresswise in the registers 114-126 and 132-138, as shown.

Referring now to FIG. 3, timing diagram 150 illustrates the sequence of events arising from the parallel execution of two separate streams of instructions to the two distinct processors. In the exemplary timing diagram shown, the floating point processor has a short instruction of six execution cycles while the integer processor has a uniform instruction cycle length of four cycles. For each corresponding processor to maintain a complete account of each instruction which has not yet completed execution, the corresponding processor would include at least the same number of registers as there are instruction cycles necessary for the execution of the particular instruction executed by the processor. Accordingly, the floating point processor 106, FIG. 2 is illustrated with at least six registers while the integer processor 108, FIG. 2 includes four registers, corresponding to the execution lengths of at least six and four cycles shown at 152 and 154, FIG. 3, respectively. A long floating point instruction 156 is followed by a shorter instruction 158 which begins at least one cycle after the long instruction 156 and ends before either the correct execution of the instruction 156 or the detection of an exception at 162. According to the present invention, as instructions 158 and 160 have been completed, before the cessation of execution of the instruction 156 and due to the exception 162, those instructions will not be re-executed. Similarly, integer processor instructions 154, 164, 166, 168 and 170, also having been completed, will not be re-executed.

When the instruction is inhibited at 175 due to the exception at 162, the long instruction 156, floating point instructions 172, 174 and 176, and integer instructions 178 and 180 are inhibited from further execution at 175. The exception is serviced at 182 and results in a re-execution or restart of the long instruction 156A by re-entering the instruction in the pipeline at 184, which continues without exception until completion at 186.

As previously mentioned, completed floating point instructions 158 and 160 are not re-executed, as re-execution would likely result in an erroneous result having modified the same registers multiple times. The instructions 172, 174 and 176, having been inhibited from completion, are re-executed at 187, 188 and 190, respectively, to resume normal execution in the sequence in which the instructions originally occurred. The program counter generator 148 of FIG. 2, having been allowed to restart, provides a new instruction 193, which follows the last instruction 176A into the floating point processor 106.

Integer instructions 178 and 180, also having been inhibited at 175, are re-executed at 192 and 194, respectively, and are completed without exception.

Modifications and substitutions made by one of ordinary skill in the art are considered to be within the scope of the present invention. For instance, the number of registers and the particular implementation of the pipeline processor may be altered by one of ordinary skill to include a variety of structures and numbers of registers and still be considered within the scope of the present invention. Therefore, the present invention is not limited except by the claims which follow.

What is claimed is:

1. Apparatus for executing a plurality of pipelined instructions, comprising:

an instruction source for providing pipelined instructions having variable length execution cycle times and including at least one short instruction and at least one long instruction;

a first pipelined processor, coupled to said instruction source, for executing a first sequence of said pipelined instructions, said first pipelined processor beginning execution of said at least one short instruction after beginning execution of said at least one long instruction, said first pipelined processor including detection means for detecting an exception caused by an excepted instruction of said first sequence of pipelined instructions being executed, said detection means detecting said exception after said at least one short instruction has completed execution;

first inhibit means, coupled to said detection means and responsive to said detected exception, for inhibiting further execution of said excepted instruction;

identification means, coupled to said detection means and responsive to said detected exception, for identifying at least one pending instruction of said first sequence of pipelined instructions being executed, said at least one pending instruction including said at least one long instruction;

second inhibit means, responsive to the identification means, for inhibiting further execution of said at least one pending instruction;

exception handler means, coupled to said detection means and responsive to said detected exception, for saving states of said first pipelined processor, for serving said exception and for restoring the saved states of said first pipelined processor; and re-execution means, coupled to said first and second inhibit means, and responsive to said exception handler means and said identification means, for causing said first pipelined processor to re-execute said excepted instruction and said at least one pending instruction in an order corresponding to said first sequence of pipelined instructions, said re-execution means precluding re-execution of said completed at least one short instruction, wherein said first pipelined processor re-executes only said excepted instruction and said at least one pending instruction.

2. The apparatus of claim 1, wherein said at least one pending instruction and said excepted instruction includes said at least one long instruction.

3. The apparatus of claim 1, further comprising a second pipelined processor, coupled to said instruction source, for executing a second sequence of said pipelined instructions, said second pipelined processor including third inhibit means, coupled to said detection means and responsive to said detected exception, for inhibiting further execution of said second sequence of pipelined instructions and for identifying a second at least one pending instruction of said second sequence of pipelined instructions being executed;

delay means, responsive to said third inhibit means, for inhibiting execution of said second sequence of pipelined instructions at least until said re-execution means causes said first pipelined processor to re-execute said excepted instruction; and second re-execution means, coupled to said delay means and responsive to said re-execution means, for causing said second pipelined processor to re-execute said second at least one pending instruction.

4. The apparatus of claim 3, wherein said delay means comprises means for stalling said second pipelined processor.

5. The apparatus of claim 3, wherein said delay means comprises means for causing said second pipelined processor to execute successive no-op instructions.

6. The apparatus of claim 3, wherein said first pipelined processor is a floating point processor and said second pipelined processor is an integer processor.

7. A method of executing a plurality of instructions in a pipelined computer apparatus, comprising the steps of:
providing a plurality of instructions having variable length execution cycle times and including at least one short instruction and at least one long instruction;
executing a first sequence of said instructions in a first pipelined processor;
executing a second sequence of said instructions in a second pipelined processor concurrently with the step of executing said first sequence of instructions;
wherein the steps of executing said first and second sequences of instructions include beginning execution of said at least one short instruction after beginning execution of said at least one long instruction;
detecting an exception caused by an excepted instruction of one of said first and second sequences of instructions during the steps of executing said first and second sequences of instructions and after said at least one short instruction has completed execution;
identifying a first at least one pending instruction in at least one of said first and second sequence of instructions concurrently with said step of detecting said exception, said first at least one pending instruction including said at least one long instruction;
inhibiting further execution of said excepted instruction and said first at least one pending instruction;
servicing said exception by at least saving a state of one of said first and second pipelined processors executing said excepted instruction, handling said exception and restoring the saved state of said one of said first and second pipelined processors executing said excepted instruction; and
re-executing said excepted instruction and said first at least one pending instruction in an order corresponding to said first and second sequence of instructions, wherein said re-executing step includes the step of precluding re-execution of said completed at least one short instruction.

8. The method of claim 7, wherein said first at least one pending instruction and said excepted instruction includes said at least one long instruction.

9. The method of claim 7 further including the step of:
halting execution of with instructions on one of said first processor and said second processor not servicing said exception and not re-executing said excepted instruction during the steps of servicing said exception and re-executing said excepted instruction by the other of said first and second processors.

10. The method of claim 9 wherein said step of halting involves stalling said one of said first processor and said second processor not servicing said exception and not re-executing said excepted instruction.

11. The method of claim 9 wherein said step of halting includes executing no-op instructions on said one of said first processor and said second processor not servicing said exception and not re-executing said excepted instruction.

* * * * *